United States Patent

[11] 3,609,545

| [72] | Inventor | William E. Engelhard |
| | | Apalachin, N.Y. |
| [21] | Appl. No. | 856,854 |
| [22] | Filed | Sept. 10, 1969 |
| [45] | Patented | Sept. 28, 1971 |
| [73] | Assignee | Pyro-Serv Instruments Inc. |
| | | North Arlington, N.J. |
| | | Continuation of application Ser. No. |
| | | 521,347, Jan. 18, 1966. |

[54] HANDHELD MEASURING INSTRUMENT WITH MULTIPLE CONTROLS OPERABLE BY THE HOLDING HAND
6 Claims, 7 Drawing Figs.

[52] U.S. Cl. .................................... 324/156, 324/98
[51] Int. Cl. ..................................... G01r 1/04, G01r 17/02
[50] Field of Search ............................... 324/156, 157, 98, 106; 73/359

[56] References Cited
UNITED STATES PATENTS

| 1,593,626 | 7/1926 | Foote ................. | 324/98 |
| 2,277,365 | 3/1942 | Michael ............... | 324/98 X |
| 2,323,996 | 7/1943 | Hubbard .............. | 324/156 X |
| 3,089,561 | 5/1963 | Michael et al. ....... | 324/156 X |
| 2,968,765 | 1/1961 | Parmater et al. ..... | 324/156 |
| 1,791,563 | 2/1931 | Horn .................. | 73/359 X |
| 2,968,765 | 1/1961 | Parmater et al. ..... | 324/156 |
| 3,089,561 | 5/1963 | Michael et al. ....... | 181/.5 |
| 2,277,365 | 3/1942 | Michael .............. | 324/54 |

FOREIGN PATENTS

| 6,402,249 | 9/1964 | Netherlands .......... | 324/15-6 |

Primary Examiner—Alfred E. Smith
Attorney—Sommers & Sommers

ABSTRACT: A hand-grasped measuring instrument having a plurality of controls all of which are separately and selectively operable by the fingers and thumb of the hand grasping the instrument.

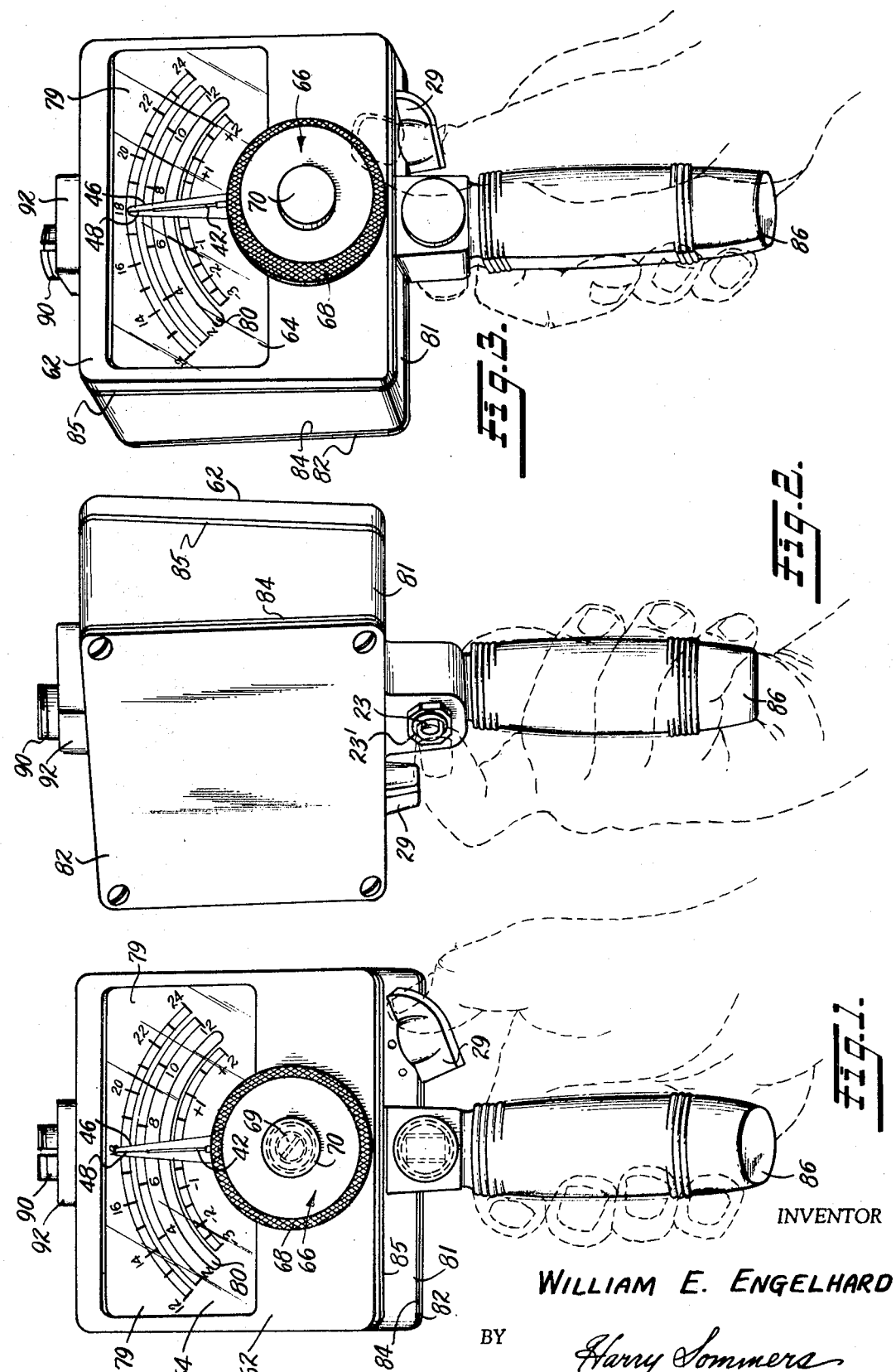

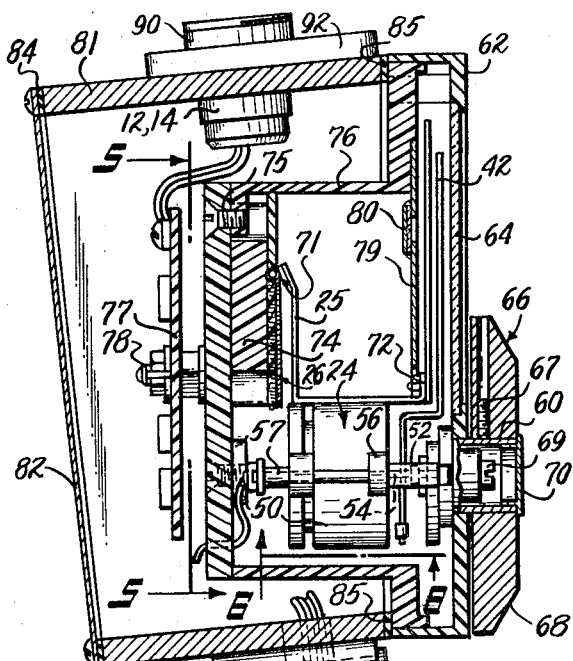
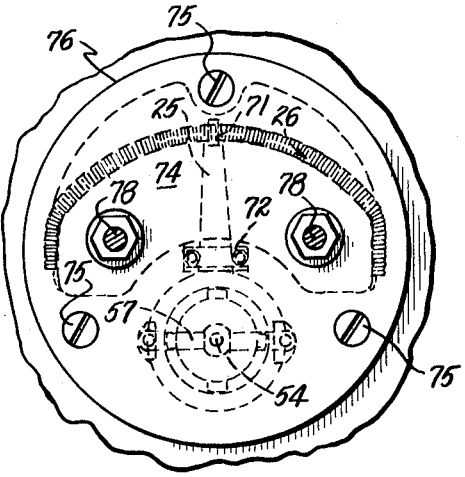
Fig.5.
Fig.7.
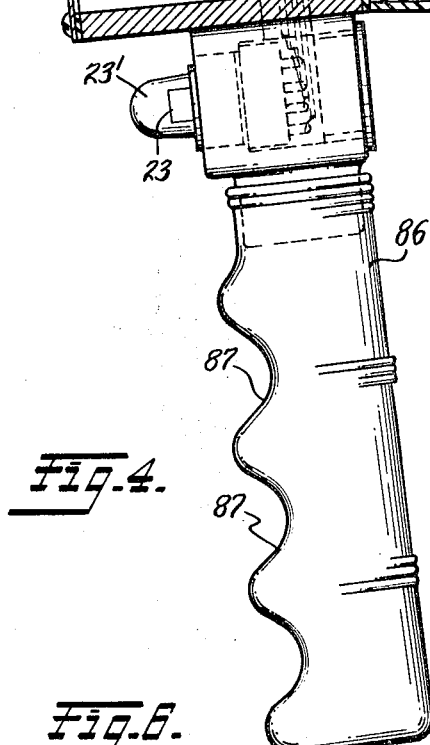
Fig.4.
Fig.6.
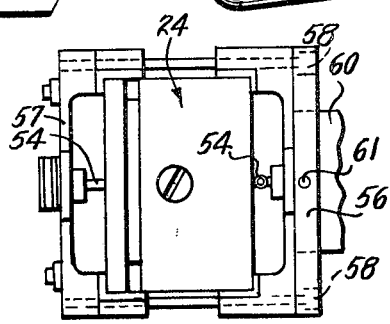
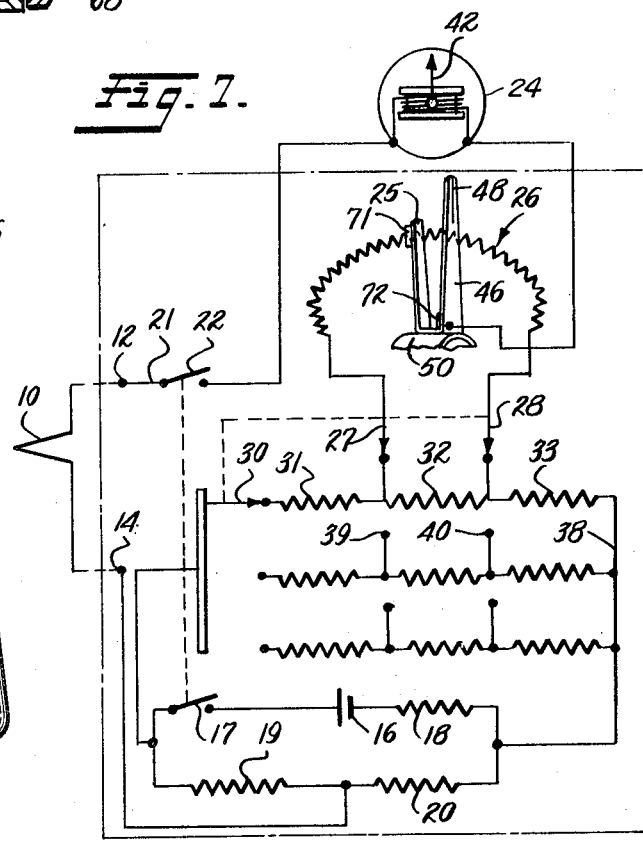
INVENTOR
WILLIAM E. ENGELHARD
BY Harry Sommers
ATTORNEY

HANDHELD MEASURING INSTRUMENT WITH MULTIPLE CONTROLS OPERABLE BY THE HOLDING HAND

This is a continuation of application Ser. No. 521,347, filed Jan. 18, 1966 and now abandoned.

This invention relates to a handheld instrument with meter face.

In particular, it relates to an instrument which has associated therewith a multiplicity of controls manipulatable to attain a reading on the meter.

It is an object of this invention to so arrange parts on an instrument of the character described that the fingers of the hand holding the instrument may manipulate the controls.

It is still another object of the invention to so arrange the angle of the meter face with respect to the observer as to facilitate reading the same when the handle of the instrument is held in a natural inclined position.

Another object of the invention is to combine a meter and its pointer with a potentiometer and an associated indicating arm in such a manner that the pointer and indicator arm may be brought into overlapping relationship to obtain a single indicated reading on a selected scale of the meter, in accordance with the magnitude of the function being measured.

Other objects of the invention will become apparent upon further consideration of the following specification when taken in conjunction with the accompanying drawings in which:

FIG. 1 is a view of the instrument with the face toward the observer, showing how a thumb of the hand holding the instrument may manipulate one of the controls;

FIG. 2 is a perspective view of the same instrument, looking at the back thereof, showing how an individual holding the instrument may manipulate a second control on the instrument by the use of his forefinger;

FIG. 3 is another perspective view of the instrument with the face toward the observer, showing how the thumb of the hand holding the instrument may manipulate a third of the controls while the forefinger keeps the circuit closed;

FIG. 4 is an enlarged vertical sectional view through the instrument;

FIG. 5 is a sectional view substantially on the line 5—5 of FIG. 4;

FIG. 6 is an enlarged fragmentary plan view of the stator and associated parts taken on the line 6—6 of FIG. 4; and, FIG. 7 is a diagram of a circuitry which may be employed in the instrument.

Now considering the instrument more in detail, attention is first directed to FIG. 7, showing circuitry suitable in the use of the instrument in pyrometry measurements wherein a thermocouple 10 has its leads connected to terminals 12 and 14. Within the casing of the instrument is a voltage supply such as a mercury cell 16 in series with a control switch 17 and series resistor 18 as well as potential dividing resistors 19 and 20. Resistors 18, 19 and 20 may be of suitable metals in order to effect a constant output regardless of ambient temperature conditions, as is known in the art. Terminal 12 is connected via a lead 21 to a switch 22 ganged for operation with the switch 17. These switches may be normally biased open, and are closed by pressure on a single button, as button 23 in FIGS. 2 and 4. To close off the opening in the handle housing the button, a flexible rubber covering 23' is domed over the button. Pressure on the dome-shaped covering will actuate the button. In series with the switch 22 is an ammeter 24 and in series with the ammeter is a potentiometer arm 25 of a potentiometer 26 whose terminals are connected to the movable arms 27 and 28 of a switch whose operating knob is indicated at 29 in FIGS. 1 to 3. Also connected for conjoint movement with the switch arms 27 and 28 is a switch arm 30. This arm makes contact in accordance with the position of know 29 with one end of any of a series connected string of resistors, as series connected string 31, 32 and 33. The other end of each string of resistors is connected via a lead 38 to the junction between resistors 18 and 20 in the potentiometric voltage supply There are as many strings of resistors as there are scales on the meter face, three such strings and three meter scales being illustrated. The switch arms 27 and 28 as they are shifted along with switch arm 30 contact with terminals, such as indicated at 39 and 40, from the ends of the intermediate resistor of a string, as from the ends of resistors 32 of the first string. A convenient means for switching can be effected through the use of a multiple deck wafer switch with the arms 27, 28 and 30 as three movable arms and the contacting terminals stationarily mounted on the decks. The wafer switch can be operated by switch knob 29. This wafer structure is conventional and therefore needs no illustration.

The middle resistors of the string are so chosen that when the meter is utilized, in the manner to be explained, the scales will each correspond to and give temperature readings corresponding to different ranges of thermocouple readings. The resistors 31 and 33 in each string are compensating and ballast resistors to maintain accuracy of reading of the meter regardless of ambient temperature conditions and to provide ample resistance in the circuit so as not to impose too great a drain on the battery 16, when a reading is being taken.

When a thermocouple reading is taken, by reason of closure of switches 17 and 22, the thermocouple voltage will be impressed on the wiring system just described. A needle 42 of the meter 24 will then be shifted away from its null position at the center of the dial. In the past, to attain an accurate reading, it has been customary to shift the position of potentiometer arm 25 located in an area removed from the pointer of the ammeter so as to bring the meter needle back to its null point and then read the thermocouple temperature on a scale, remote from the meter scale, over which a transparent indicator arm 46, fast with the arm 25, operates. The arm 46 has a fiducial line 48 inscribed thereon. This necessitated the maintenance of observation of the scale on the meter and the subsequent reading of the value on the potentiometer.

With the structure of the combined meter and potentiometer to be described, the potentiometer indicator arm and the galvanometer pointer both operate over the same scales, whereby the necessity for observation of differently located scales is avoided.

The meter movement, see FIG. 4, comprises a Weston meter of the general type shown in the patent to Sheehan U.S. Pat. No. 2,704,349, having a stator 50 and a galvanometer coil assembly 52 provided with horizontal pivot pins 54, the coil assembly having rigidly secured thereto the counterweighted needle or pointer 42. A mounting bridge piece 56 is suitably secured to the stator, as by screws 58, these screws extending also through and threaded into a rear crosspiece 57 clamped to the stator. Said bridge piece is fastened to the hub 60 by means of a fastening 61, said hub being rotatably mounted in the front panel 62 of the meter. The pointer 42 extends behind a transparent face 64 suitably mounted in the front panel. A finger manipulatable disc 66 is secured to the hub 60, as by a setscrew 67, said disc being of a diameter so that its lower edge is substantially level with the lower edge of the front panel. The disc may be bevelled as indicated at 68 and knurled on the bevelled edge to facilitate rotating the disc, the hub 60 in the front panel and the ammeter. The fiducial line 48 on indicator arm 46 should be at the null position. If not, the torque on the upper suspension in the meter can be adjusted, as known in the art, to shift the galvanometer pointer to its null position. For this purpose suitable provision is made as by making the hub 60 hollow to allow for a screwdriver to engage the pointer position-adjusting screw 69 on the Weston meter. A suitable friction fit removable dust cap 70 covers the opening in hub 60.

The potentiometer arm 25, for convenience, is part of an L-shaped strap, the long arm of which strap carries a contact 71 and the short arm of which has an upstanding ear 72 to which the indicator arm 46 is secured. The L-shaped strap is soldered or otherwise fastened to the stator of the ammeter so as to move with the stator. The contact 71 operates over the coil of potentiometer 26 conveniently mounted on a polystyrene or other insulating block 74 fastened, as by screws 75, to a case 76 surrounding the ammeter.

A circuit board 77 carrying the resistors and the battery is suitably supported within a casing, as by being secured to the rear end of studs 78 extending integrally from the rear side of block 74. To the front face is secured, by any suitable means, a meter dial 79 having the various scales imprinted thereon over which the needle 42 and indicator arm 46 play. An arcuate mirror 80 is adhered to the rear of the scale, as is common in ammeters.

An outer casing for the meter movement and circuit board is provided, the same comprising a rectangular enclosure 81 to which is fastened in any desired manner the front panel 62. Also fastened to this enclosure is a rear panel 82 sealed to the enclosure 81 by means of a rubber gasket 84, the rear panel being suitably screwed to the enclosure 81. A rubber gasket 85 is also interposed between the enclosure and the meter panel 62. The enclosure has affixed thereto a handle 86, located centrally of the width of the enclosure and near the meter face end of the enclosure. The handle extends at a slight angle to the front face, as indicated in the drawing, particularly FIG. 4.

This arrangement facilitates reading of the meter since it is usual to hold the handle level, at which time the meter face can be viewed perpendicularly, or at a slight vertical angle, so that one may read the meter viewing it at right angles while holding it in front of him.

The handle is suitably contoured to provide a handgrip with the fingers falling in horizontal valleys 87 between ridges. The switch knob 29 is within convenient reach of the thumb on the hand holding the handle and may easily be operated by the thumb. The ganged switch 17, 22 is under control of the normally biased open pushbutton 23 on the upper rear of the handle and is under control of the forefinger of the hand grasping the handle. The disc 66 can easily be rotated by the thumb of the same hand. The terminals 12, 14 for the thermocouple are led into a coupling member 90 in an embossment 92 at the top of the enclosure.

The three meter scales are shown in the drawing. To assist in attaining a nonparallax condition, the upper two scales are separated from the lower scale by an area provided with the mirror 80, whereby it is easy to attain an accurate superimposed relationship of the fiducial mark 48 and a corresponding mark on the pointer 42, as well as an accurate reading of the scales.

In operation of the instrument, it is initially adjusted by moving potentiometer arm 25 to the midposition or zero position on the bottom scale. At this time, with no thermocouple connected with the terminals 12, 14, the needle 42 should overlie the arm 25 and also be in the zero position. If not, an initial adjustment should be made by removing the frictionally held cap 70 and the screw 69 manipulated to bring the needle to zero position.

Now, with a thermocouple connected to the terminals and the instrument held in the right hand, a suitable scale is selected by rotation of knob 29 by the thumb, and the switch button 23 is depressed by the forefinger. This will cause the galvanometer coil to swing and move the needle 42 over the selected scale. Next, the thumb of the operator will rotate the disc 66 to bring the fiducial line 48 on the indicator arm 46 directly under the needle. Since, while indicator arm 46 is moving the whole ammeter is rotating, including coil and stator coincidence could never be effected save for the presence of the potentiometer 26 over which the arm 25 swings as the ammeter unit is oscillated. By the use of this arrangement, including the mirror 80, parallax can be avoided and an accurate reading may be taken on the scale, the scale readings, of course, being calibrated in accordance with the temperatures sensed by the thermocouples used with the instrument.

Having thus described the invention, what is claimed is:

1. A handheld thermocouple pyrometer, comprising:
   a. a casing and a handle supporting said casing;
   b. a temperature-calibrated scale on the face of said casing;
   c. terminal means for connecting the output of a thermocouple to said pyrometer;
   d. a slide wire potentiometer in said casing, electrically connected to measure the output potential of said thermocouple, said potentiometer having a rotatable arm and a fiduciary pointer rotatable therewith, said pointer overlying said scale, the axis of rotation of said arm and pointer being transverse to the plane of said scale;
   e. a galvanometer in said casing electrically connected to said potentiometer to indicate the balance thereof, said galvanometer having a current-indicating pointer overlying said scale, said galvanometer body being movable with respect to said scale by rotation about the said axis of rotation for said potentiometer arm and fiduciary pointer whereby said rotation effects translation of said current-indicating pointer across said scale; and
   f. potentiometer arm adjustment means for adjusting the balance of said potentiometer, said means being rigidly connected to said potentiometer arm and said galvanometer body, whereby said galvanometer body and said arm are rotated together, whereby balancing of said potentiometer may be indicated by coincidence of said fiduciary pointer with said galvanometer pointer over said scale.

2. Apparatus according to claim 1, further including switching means for activating said potentiometer and connecting the output of said thermocouple thereto.

3. Apparatus according to claim 2, further including range-changing means for interchanging resistors in said casing, thereby changing the measurement range of said pyrometer.

4. Apparatus according to claim 3, wherein said potentiometer arm adjustment means, said switching means, and said range-changing means are external to said casing and are all within reach of the fingers and thumb of a hand grasping said handle.

5. Apparatus according to claim 4, wherein said potentiometer arm adjustment means is a disc at the lower central portion of the front of said casing, said switching means is a multiple switch at the upper portion of the handle, at the back thereof, and said range changing means is a knob located on the bottom wall of the casing adjacent the handle.

6. Apparatus according to claim 4, wherein the face of said casing bearing said scale forms a fixed angle of less than 180° with the axis of said handle, whereby reading of said scale is facilitated.